2,738,264

PRODUCT AND PROCESS OF FORMING A PLANT STIMULANT AND TONIC-ACTING COMPOSITION FOR SOIL CONDITIONING

James W. Watson, Vancouver, British Columbia, Canada

No Drawing. Application August 27, 1952,
Serial No. 306,735

18 Claims. (Cl. 71—16)

My invention relates to a product and process of forming said product, namely, a plant stimulant and tonic-acting composition for soil conditioning.

More particularly, my invention or discovery relates to said process and product which is characterized by its gradual release of its effectiveness over a prolonged period.

Plant growth is aided by two types of products—fertilizers and compositions known as plant stimulants. My invention relates to a plant stimulant and soil conditioning agent in definite contrast to the use of fertilizers. The objections to fertilizers are many, among which are: Organic fertilizers often induce disease in the plants which are being propagated. Also they introduce weed seed to soil. In the case of inorganic fertilizers, objection obtains, as claimed by some horticulturists, that the bacteria of the soil so treated by inorganic fertilizers is injured. In short, the critical period of the development of plants occurs during the plant germination period and its early development. It is for this critical period that I propose providing a composition which operates as a plant stimulant and tonic-acting composition for soil conditioning which has proven to be very superior and successful. Particularly has it been noted that the plant propagation is highly efficient and the plants are characterized by an evenness of growth and healthy size. Another criticism of inorganic fertilizers is that they provide a plant stimulant for a very short period and then must be renewed. This means very definitely a costly procedure both in labor and money in providing for and aiding the plant growth. Such frequent treatments operate in exhausting the soil.

One primary objection to the plant stimulants (as distinguished from fertilizers) now on the market is that they do not provide for a gradual uniform growth or development of the plant. On the contrary, they operate more as a relatively short period stimulant and then the plant is allowed to relapse until the next application. It is practically impossible to provide in any large scale development of plant production a uniform treatment for stimulating growth with the products now on the market. In short, it is a primary object of my invention to provide a plant stimulant and tonic-acting composition for soil conditioning which will provide uniform development of the plant. My object is to provide such a composition which will gradually release its effectiveness for the plants and provide for a prolonged period its action so that the application of such composition of my invention will be characterized by its economy, both as to labor and money, and at the same time will provide naturally for the uniform aiding and gradual development of the plants treated.

A nurseryman ordinarily has very extensive mixing of materials and soil to perform in his efforts in plant production. Therefore, it is one of the primary object of my invention to provide a ready mixed composition of the character described which is all ready to be applied to the plant with extremely little or no mixing in most cases involved.

Another fundamental object is the providing of said composition which in and of itself operates with a relatively very small quantity to condition a vastly greater quantity of soil. This, with the results obtained, establishes definitely that the operation of my invention does not depend for its effectiveness upon its contribution as a fertilizer but very definitely upon its contribution as a soil conditioner. The quantity of the soil conditioned by a treatment with the product of my invention is a plurality of times greater than the weight of said product applied. This action of the product of my invention definitely produces a very much more economical product than has been heretofore known.

A fundamental difficulty in providing plant stimulants and tonic-acting compositions for soil conditioning is to provide a composition of matter which operates as a reservoir for its contribution and which is subject to being released gradually and uniformly over a relatively long period of time and thereby provide for non-injury to young plant roots. The product of my invention is characterized by the following attributes:

1. Provides uniformity of plant propagation;
2. Although organic in character, introduces no diseases to the young plants; and
3. Is of a ready-mixed character so as to require no extensive mixing on the part of the user and at the same time provides for a relatively far more economical composition of said character than is presently known.

In my extended experimental work, it has developed that one of the major problems with which I have been confronted is to provide for the delayed action of the solubles while disposed in the soil in direct contact with the plant or the seed under conditions for the growth of the plant or seed which conditions could also include the element of moisture necessary for the plant growth.

I have discovered that whale soluble (especially when formed as herein set forth) when combined with Sphagnum peat moss results under certain definite conditions in reciprocal interaction which is mutually beneficial. In short, the whale soluble and the Sphagnum peat moss complement each other.

All my experimental work indicates that when so little can do so much it is inevitable that it must operate as a soil conditioner after the manner of a tonic. My efforts have established, positively and definitely, a vastly superior development in the plant life or growth.

While the combination forming the product of Sphagnum peat moss with whale soluble in my invention operates in providing prolonged action of soil conditioning and plant stimulant, nevertheless, on the other hand, the Sphagnum peat moss does operate to absorb the whale soluble formed as set forth in my invention and therefore operates the more readily to transform or change the Sphagnum peat moss into the decayed compost or humus condition. Nevertheless, in the compost condition, it does continue to operate as a soil conditioning agent even though it may have lost much of its water retaining qualities.

While I do not know the full scientific explanation of just how the composition of my invention operates to maintain its striking results, nevertheless the fact remains that when applied as herein disclosed and taught the remarkable results do follow. It may be that the composition of my invention operates in part at least as a catalytic agent.

The whale solubles employed in my invention are obtained by the reduction of substantially the entire whale to meal, oil and solubles by the modern methods as follows: Substantially the entire whale is employed. The only part of the whale removed is the liver which is separately treated as a source of very valuable product in the form of vitamins. The rest of the whale with all its various glandular organs is employed. The whale is cut up and fed into steel retorts where it is cooked under about forty pounds steam pressure for several hours. During the time of cooking the material is constantly agitated, the bones and blubber being all mixed up together, and when fully cooked the bones become soft pulp. The cooked material is then transferred to a continuous screw press where practically all the oily liquor is pressed from the material. The solids pass to a rotary drier where the moisture content is reduced to a low point, the finished product being the whale meal. The liquor passes to a centrifugal machine where all the available oil is removed from the liquor—the residue then passes to storage tanks and held for a considerable time at high temperature, i. e. of the order of 200° F. It is then returned to centrifugals which remove all recoverable oil. The residue is then passed through an evaporation process by which all water is evaporated until the essence only is retained and reduced to a heavy syrup—one-half whale soluble and one-half water.

A further later step in this whale soluble production has been made by a further drying process reducing it to a very fine, dry powder. This fine, dry powder is the material I use in the production of my invention in its preferred form.

There has been during the past few years a large amount of fish emulsion or fish soluble (said emulsion and fish soluble being the same product) all produced in a wet condition from the herring, sardine, salmon and menhaden, but there is a considerable difference in the action of these solubles in plant and animal nutrition as compared to the composition of my invention. It will be understood that said fish emulsion or fish soluble is prepared by bringing the temperature in cooking only to the boiling point. In contrast, the whale soluble employed in my invention is cooked slowly under about forty pounds pressure for several hours.

After a good deal of experimental work I have found that much better plant growth could be obtained from the whale product when used in combination with our horticultural Sphagnum peat moss. Apart from the bacterial activity created in the Sphagnum peat moss and the growth factors involved, I find that where the wet whale soluble was applied it was possible to wash over fifty per cent of the soluble out of the peat moss by heavy watering or weathering condition, but when I applied it in the fine powder form, it would not so separate from the Sphagnum peat moss. This creates a combination which works together and gives to the grower the full value of the whale soluble and which gradually provides its effectiveness for plant growth along with the decomposition of the peat moss. Humus thus developed gives the growing plant a healthy and sustained growth by wholly organic feeding or conditioning of the soil.

In my preferred process, I mix finely divided or comminuted dry whale solubles—said solubles being derived in the manner set forth above. The proportions of the whale solubles and the peat moss depend upon the character of the plants to be treated. Some plants can stand a great deal more than others. I have found that adding 2% to 4% of the solubles to 96% to 98% of the dry peat moss by weight will give excellent results for a wide range of plants, including tuberous begonias, geraniums, primroses, lettuce, radishes and cabbages. It will be understood that when this composition of matter of this invention is applied to the plant that the gardener ordinarily mixes it with about equal volume of soil and applies this directly to the roots of the plant or to the seed. On the other hand, in the case of applying this composition of matter to full grown fruit or nut bearing trees the proportions may be considerably increased, even to 10%. The composition is applied in the same manner as above set forth for plants.

My preferred proportion is in the range of 2% to 4% by weight of solubles to 96% to 98% of what is commercially known as dry Sphagnum peat moss. Said commercial dry peat moss ordinarily contains moisture ranging from 15% to 35%. As set forth above, the said percentages may be varied depending upon the plants. Such percentage may be 2% to 10% by weight of solubles to 90% to 98% of what is commercially known as dried Sphagnum peat moss. These percentages are not critical. While I prefer the same, nevertheless, they may be varied by increasing or decreasing without serious change in the advantages of my invention, depending upon the plant as well as the character of the soil. Accordingly, a little experimentation will definitely establish for the particular plant and soil the proportions best suited for the particular situation. For optimum results, I prefer to have the Sphagnum peat moss slightly decomposed before intermixing. This Sphagnum peat moss is milled and screened and then mechanically intermixed with the dry whale solubles and then preferably again milled for more thoroughly incorporating the solubles with the Sphagnum peat moss, preferably comminuted to whole cellular structure. After the composition is formed, I prefer to let it stand until there is some interaction between the peat moss and the whale solubles before applying it to the plants. The lapse of time is about the only way of determining that some interaction has occurred. There is neither change in color nor odor such as to give evidence of the interaction. One of the great advantages of my invention is the fact that it does not create any offensive odors. This is of particularly great importance.

An alternate, though more costly, method is to reduce the soluble to the syrup condition noted above, having a constituency of one-half water and one-half soluble, and spray it onto the dry peat, using equivalent proportions to those specified for dry weight components. This method does not possess the same advantages as the dry process because of the leaching action herein set forth and because the moisture of the active spray may start further decomposition of the peat before it is put to proper use, and is furthermore more expensive and may require further treatment to remove the added moisture of the active solution to prevent premature decomposition of the peat component prior to shipment.

It is part of my invention and discovery that when the whale solubles are provided in dry form and are intermixed with the dry Sphagnum peat moss likewise in a dry form that they provide a product which has proven to function with all the advantages herein set forth, particularly, if does not leach out of the soil as in the case of using the wet soluble with the moss and thereby become lost to the plant and the soil in which the plant is located. I have found that when the composition of my invention is used water may be sprayed on the plant as normally applied when watering the plant without said leaching. When the composition of matter of my invention is formed as set forth, that is, when the whale solubles are added in the dry form to the commercially dry Sphagnum peat moss as disclosed, the peat moss apparently promptly begins to absorb the solubles or at least there is interaction between the two so that the two interact to the mutual benefit of each other, and there is provided a veritable reservoir of effectiveness which is gradually released supplying maximum benefit to the plant. For optimum results, I prefer to allow the intermixture of the commercially dry Sphagnum peat moss and dry whale solubles to age for a short period before same is applied to the plant, that is, I prefer to allow the composition of matter to age or stand from three to five weeks.

I have found that when the composition is formed in the manner disclosed herein that it almost requires boiling of the material to separate the whale soluble from the Sphagnum peat moss. In definite contrast is the situation where the Sphagnum peat moss is applied as a liquid spray (one-half Sphagnum peat moss and one-half water). When this is applied to the plant, then the whale soluble leaches out almost immediately when the plants are watered as commonly done in providing for the growth of the plant. I have made the important discovery that this does not occur when the composition is prepared as set forth above and when the dry whale soluble is added to the dry commercial Sphagnum peat moss.

As a sample of the laboratory tests of said liquid spray product, I find that approximately fifty per cent of the soluble solids in the blend or composition of my invention was lost immediately to the moisture and up to seventy per cent was lost within twenty-four hours. While the amount of moisture used in these tests was more than would be encountered under normal weather conditions, nevertheless it does show the high degree of leaching effect when the whale solubles are applied to the Sphagnum peat moss in wet form.

So far as I have been able to ascertain, the affinity of Sphagnum peat moss to the condensed whale solubles is such that the soluble matter applied in the dry form directly to the Sphagnum peat moss causes a cooperative effect which activates the product to cause it to serve slowly and safely to stimulate and act as a tonic in conditioning the soil for the growth of the plant life with which it comes into contact, and this over an extended period of time with uniform action.

I claim:

1. The process of forming a product acting as a plant stimulant and tonic-acting composition for soil conditioning comprising comminuting partially dried Sphagnum peat moss and intimately intermixing whale solubles with said peat moss, said whale solubles being formed by including in the preparation thereof the following steps, cooking substantially the whole whale for several hours in steam pressure retorts during agitation thereof, separating the liquid portion from the solids, removing the oil from the liquid, and removing a substantial portion of the water from the liquid.

2. The composition of matter comprising dry comminuted Sphagnum peat moss and whale solubles intermixed, said whale solubles being formed by including in the preparation thereof the following steps, cooking substantially the whole whale for several hours in steam pressure retorts during agitation thereof, separating the liquid portion from the solids, removing the oil from the liquid, and removing a substantial portion of the water from the liquid.

3. The composition of matter comprising dry comminuted Sphagnum peat moss and comminuted dry whale solubles, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a dry powder.

4. The process of forming a product acting as a plant stimulant and tonic-acting composition for soil conditioning comprising comminuting Sphagnum peat moss and intimately intermixing whale solubles in the dry and powdered state with said peat moss in the dry state, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a dry powder.

5. The process of forming a product acting as a plant stimulant and tonic-acting composition for soil conditioning comprising comminuting Sphagnum peat moss and intimately intermixing whale solubles in the comminuted dry state with said peat moss in the dry state and permitting said composition to age for partial interaction of the components thereof, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a comminuted dry state.

6. The process of forming a product acting as a plant stimulant and tonic-acting composition for soil conditioning comprising comminuting Sphagnum peat moss and intimately intermixing whale solubles in the comminuted dry state with said peat moss in the dry state and permitting said composition to age for partial interaction of the components thereof in developing water resistance to leaching, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a comminuted dry state.

7. The process of forming a product acting as a plant stimulant and tonic-acting composition for soil conditioning comprising comminuting Sphagnum peat moss and intimately intermixing whale solubles in comminuted dry state with said peat moss in the dry state and permitting said composition to age for a period of three to five weeks, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a comminuted dry state.

8. The process of forming a product acting as a plant stimulant and tonic-acting composition for soil conditioning comprising comminuting Sphagnum peat moss and intimately intermixing whale solubles in comminuted dry form with said peat moss in a dry state in the proportions of 90% to 98% of said peat moss and 2% to 10% of said whale solubles, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a comminuted dry state.

9. The process of forming a product acting as a plant stimulant and tonic-acting composition for soil conditioning comprising comminuting Sphagnum peat moss and intimately intermixing whale solubles in the dry and powdered state with said peat moss in the dry state in the proportions of 90% to 98% of said peat moss and 2% to 10% of whale solubles, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a dry powder.

10. The process of forming a product acting as a plant stimulant and tonic-acting composition for soil conditioning comprising comminuting Sphagnum peat moss and intimately intermixing whale solubles with said peat moss in a dry state, said whale solubles being formed by slowly cooking substantially the whole whale under pressure for several hours, subjecting the meaty mass to pressure to separate the liquor, removing the oil, subjecting and holding the residue liquor at high temperature, evaporating the water content until the liquor is one-half solubles and one-half water.

11. The process of forming a product acting as a plant stimulant and tonic-acting composition for soil conditioning comprising comminuting Sphagnum peat moss and intimately intermixing whale solubles in the dry state with said peat moss in the dry state, said whale solubles being formed by slowly cooking substantially the whole whale under pressure for several hours, subjecting the meaty mass to pressure to separate the liquor, removing the oil, subjecting and holding the residue liquor at high temperature, evaporating the water content and reducing the residue to dry powder.

12. The process of forming a product acting as a plant stimulant and tonic-acting composition for soil conditioning comprising comminuting Sphagnum peat moss and intimately intermixing whale solubles in the dry and powdered state with said peat moss in the dry state, said whale solubles being formed by slowly cooking substantially the whole whale under pressure for several hours, subjecting the meaty mass to pressure to separate the liquor, removing the oil, subjecting and holding the residue liquor at high temperature, evaporating the water content and reducing the residue to dry powder.

13. The process of forming a product acting as a plant stimulant and tonic-acting composition for soil conditioning comprising comminuting Sphagnum peat moss and intimately intermixing whale solubles in the dry and powdered state with said peat moss in the dry state, said whale solubles being formed by slowly cooking substantially the whole whale under pressure for several hours, subjecting the meaty mass to pressure to separate the liquor, removing the oil, subjecting and holding the residue liquor at high temperature, evaporating the water content and reducing the residue to dry powder, and aging said composition for the period permitting a partial interaction of the components thereof.

14. A product acting as a plant stimulant and tonic-acting composition for soil conditioning comprising comminuted Sphagnum peat moss; and whale solubles in the dry and powdered state intermixed with said peat moss in the proportions of 90% to 98% of said peat moss and 2% to 10% of whale solubles, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a dry powder.

15. A product acting as a plant stimulant and tonic-acting composition for soil conditioning comprising a reaction product formed by aging comminuted Sphagnum peat moss substantially reduced to the point of whole cellular structure intermixed with whale solubles in a dry and powdered state, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a dry powder.

16. A product acting as a plant stimulant and tonic-acting composition for soil conditioning comprising the reaction product formed by aging comminuted Sphagnum peat moss substantially reduced to the point of whole cellular structure intimately intermixed with comminuted dry whale solubles in the dry and powdered state, said aging extending to the point of uniting the said moss and solubles in causing the same to be characterized by being resistant to leaching, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a comminuted dry state.

17. A product acting as a plant stimulant and tonic-acting composition for soil conditioning comprising the reaction product formed by aging comminuted Sphagnum peat moss intimately intermixed with comminuted dry whale solubles, said aging extending to the point of uniting the said moss and solubles in causing the same to be characterized by being resistant to leaching, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a comminuted dry state.

18. A product acting as a plant stimulant and tonic-acting composition for soil conditioning comprising the reaction product formed by aging comminuted Sphagnum peat moss substantially reduced to the point of whole cellular structure intimately intermixed with comminuted dry whale solubles in the dry and powdered state, said aging extending to the point of uniting the said moss and solubles in causing the same to be characterized by being resistant to leaching, said whale solubles being formed by including in the preparation thereof the following steps, cooking substantially the whole whale for several hours in steam pressure retorts during agitation thereof, separating the liquid portion from the solids, removing the oil from the liquid, and converting the remaining liquid to a dry powder.

References Cited in the file of this patent

UNITED STATES PATENTS

| | | |
|---|---|---|
| 12,480 | Demolon et al. | Mar. 6, 1855 |
| 23,467 | Hyde | Apr. 5, 1859 |
| 33,706 | Hyde | Nov. 12, 1861 |
| 99,452 | Lugo | Feb. 1, 1870 |
| 1,413,200 | Thompson | Apr. 18, 1922 |

OTHER REFERENCES

Bruttini: Uses of Waste Materials, P. S. Kings & Sons Ltd., 1923, pages 245 and 248.